R. A. ARNOLD.
PLUMB LINE HOLDER.
APPLICATION FILED AUG. 21, 1917.

1,263,017.

Patented Apr. 16, 1918.

Inventor
R. A. Arnold.

By
Attorneys.

UNITED STATES PATENT OFFICE.

RAYMOND A. ARNOLD, OF MARINE CITY, MICHIGAN.

PLUMB-LINE HOLDER.

1,263,017.            Specification of Letters Patent.      Patented Apr. 16, 1918.

Application filed August 21, 1917. Serial No. 187,502.

*To all whom it may concern:*

Be it known that I, RAYMOND A. ARNOLD, a citizen of the United States, residing at Marine City, in the county of Saint Clair and State of Michigan, have invented certain new and useful Improvements in Plumb-Line Holders, of which the following is a specification.

This invention relates to improvements in devices for adjustably suspending plumb-bobs, more particularly to devices of this character employed in connection with surveyors' instruments such as transits, levels and the like, and has for one of its objects to provide a simply constructed device whereby the plumb line may be supported and adjusted to control the elevation of the plumb bob.

With these and other objects in view, the invention consists in certain novel features of construction, as hereinafter shown and described and then specifically pointed out in the claim.

The improved implement may be employed in connection with plumb lines employed for various purposes, but is more particularly adapted for employment in connection with surveyors' instruments, and for the purpose of illustration is shown thus applied, and in the drawings employed to illustrate the preferred embodiment of the invention.

Figure 1:
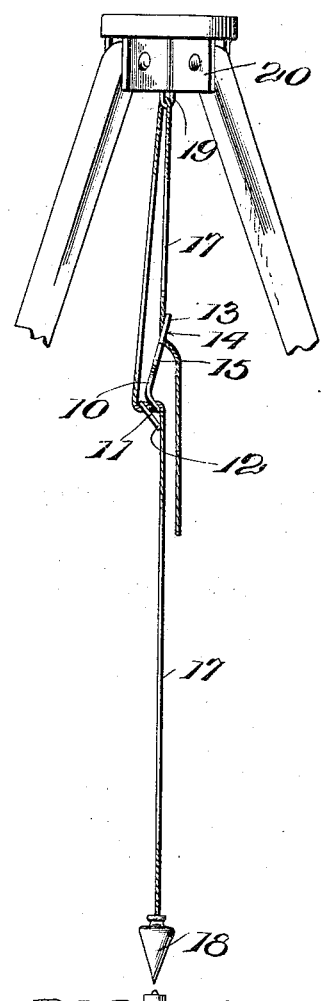
Figure 1 is a side view of a portion of the tripod head of a surveyor's instrument including the plumb line and the plumb bob with the improved attachment applied.
Figure 2:
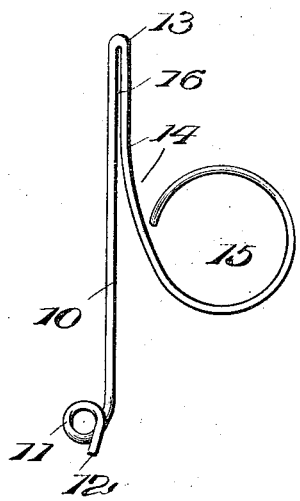
Fig. 2 is an enlarged detached side elevation of the improved device.
Figure 3:
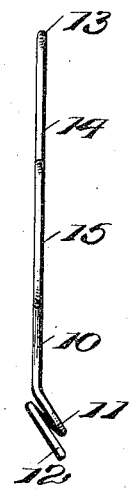
Fig. 3 is an edge view of the device as shown in Fig. 2.

The improved device is constructed from a single section of wire, preferably tempered or hardened to increase its resiliency, and may be of any suitable metal or metallic compound. The improved device comprises a stock or body portion 10 bent into a relatively small coil 11 at one end with the coil directed obliquely to the longitudinal axis of the body 10 and with the terminal 12 of the coil extending beyond the same as shown. Intermediate its ends the section of wire which comprises the improved device is bent upon itself as shown at 13, and thence extended and preferably curved slightly away from the body portion 10, as shown at 14, and terminates in a relatively large finger engaging coil 15. By this means a relatively contracted socket indicated at 16, is formed between the parts 10 and 14 into which the plumb line is received and whereby the latter is locked in position relative to the device. The plumb line is represented at 17, and the plumb bob at 18, of the usual material and construction. When employed in connection with a surveyor's transit, level or other like instrument, the line 17 is first passed through the loop 11 and thence through a suspension member such as a staple 19 depending upon the tripod head 20 of the instrument, and thence forced into the socket 16 of the improved device, as illustrated in Fig. 1. When thus arranged it will be noted that the line 17 is deflected laterally where it passes through the loop 11 and is thus held with sufficient friction to hold the plumb bob 18 at any desired point, and the plumb bob may be readily adjusted vertically by simply releasing the portion of the line which is engaged with the socket 16 and drawing the line through the staple 19 or permitting the line to pass in the opposite direction through the staple by the gravity of the plumb bob. It will be noted that the loop or eye 11 is formed by simply coiling a portion of the wire from which the device is constructed around a suitable mandrel, and the extended terminal 12 permits the line to be inserted into the loop at any desired point and without threading the line through the loop or eye. This materially simplifies the operation of connecting the line to and detaching it from the improved device. Thus no knotting or threading of the line is necessary.

Forming the eye or loop 11 obliquely to the longitudinal axis of the body 10 is an important feature of applicant's device and produces the requisite friction between the line and the suspending implement to hold the plumb bob in any adjusted position, while at the same time the device can be readily released by simply loosening the line and detaching the same from the socket 16.

The improved device is simple in construction, and can be inexpensively manufactured of any suitable material.

Having thus described the invention, what is claimed as new is:

A device of the class described formed from a section of wire bent intermediate the ends to form longitudinally directed body portions extending for a part of their lengths in close parallel relation, one of said body portions being coiled at its terminal into a loop extending obliquely to the longitudinal planes of the body portions with its free end extending in advance of the loop, the other body portion having a finger receiving eye at its free end.

In testimony whereof I affix my signature.

RAYMOND A. ARNOLD. [L. S.]